INVENTORS
ROBERT R. SMYTH
WILLIAM B. SMYTH
RALSTON B. SMYTH
BY
John A. Lahive, Jr.
ATTORNEYS INVENTORS
ROBERT R. SMYTH
WILLIAM B. SMYTH
RALSTON B. SMYTH
BY John A. Lakive, Jr.
ATTORNEYS 3,478,851
AUTOMOTIVE TRANSMISSION
Robert R. Smyth, Lincoln, Mass., William B. Smyth, Valley Forge, Pa., and Ralston B. Smyth, Brewster, Mass.; said Ralston B. Smyth assignor, by mesne assignments of four-tenths each to said Robert R. Smyth, and said William B. Smyth, and two-tenths to John A. Lahive Jr., Hingham, Mass.
Filed Aug. 9, 1967, Ser. No. 659,352
Int. Cl. F16d *67/00;* F16k *3/38*
U.S. Cl. 192—3.5                                   14 Claims

ABSTRACT OF THE DISCLOSURE

An automotive transmission which employs sensing transducers to determine the relative speeds of gear elements on the output shaft and transmission shaft. In order to shift from one gear ratio to another the outputs of these transducers are compared with the resultant signal used to control a separate power source to speed up or slow down the transmission shaft while the transmission is in neutral until the elements to be meshed are matched in speed.

FIELD OF THE INVENTION

This invention relates in general to automotive transmissions and more particularly to a transmission which may be operated in a semi-automatic or automatic mode to precisely match the speed of the elements being meshed in changing gears.

DESCRIPTION OF THE PRIOR ART

The function of an automotive transmission is to maintain a relatively narrow range of engine speeds while allowing a wide range of vehicle speeds and tractive effort so that the engine many be operated at or near its optimum power and torque at all times. In the usual mechanical transmission, the engine is connected through a friction clutch to the gear elements in the transmission and the transmission elements may in turn be coupled to an appropriate output gear by selective operation of a series of dog-type clutches. When the speed of the vehicle changes from one range to another such that the gear ratios should also be changed in order to maintain the desirable engine speed, the friction clutch is disengaged and by appropriate manipulation of the dog clutches, the gear ratio between the driven element of the friction clutch and the output shaft is changed. Upon re-engagement of the friction clutch the output shaft is again being positively driven with, however, a new ratio between it and the engine. In the ideal case, the transmission element to be meshed with the output shaft element should be rotating at a matched speed at the time of engagement to prevent damage to the elements. This requirement for matching speeds arises from the inherent design of the clutch mechanical elements which provides a positive connection between drive and driven elements in the engaged position, complete disconnection in the disengaged position, and no functionally acceptable intermediate position.

In small transmissions, such as those used in automobiles, this matching is achieved by combining each dog clutch with a synchronizer friction clutch arranged so that when the transmission is shifted from one gear to another the fraction clutch engages before the dog clutch and speed up or slows down the mating element until the speeds are equal, the dog clutch then being engaged. This solution has not, however, been successful in larger transmissions because the energy to be absorbed is much greater and large enough fraction clutches have not been designed in the available space to provide satisfactory operation.

In applications such as heavy trucking which require large transmissions, it has been the practice to achieve the matching speeds by using a system of double clutching with a conventional transmission employing dog-type clutches. In order to shift gears using this procedure, the driver disengages the friction clutch and shifts the transmission to neutral. He then re-engages the clutch and attempts to utilize the engine speed to drive the transmission element to the matched speed condition. Thus, in order to shift to a lower numerical ratio, he waits until the engine speed slows down and then re-engages the friction clutch. When he wishes to shift to a higher numerical ratio, he again commences by disengaging the friction clutch and shifting the transmission to neutral. Upon re-engaging the friction clutch, he speeds up the engine until the speed of the driven elements matches the speed of the elements to be meshed, disengages the friction clutch, shifts the dog clutch into mesh, and then re-engages the friction clutch.

It is apparent that this procedure requires a good deal of operator skill and judgment as well as the involvement of disengaging and re-engaging the friction clutch through an extra cycle. In the case of these larger transmissions one alternative design employs large, multiple disc, hydraulically actuated friction clutches in place of the dog clutches. This solution produces satisfactory operation yet it is economically expensive and requires a completely different transmission design. In another approach the dog clutch elements were power shifted into mesh without synchronization by the use of air cylinders, an approach which proved satisfactory for only small changes in speed ratios.

SUMMARY OF THE INVENTION

Broadly speaking, the transmission of the present invention employs a conventional transmission arrangement with dog clutches and with a friction clutch connecting the prime mover (the engine) to the driven elements of the transmission. The transmission also has a comparator which includes a pair of transducer elements, one positioned to provide an output signal indicating the rotational speed of the output shaft and the other positioned to provide an output signal indicating the speed of the driven element in the transmission and hence of the intermediate transmission shift. These transducer signals are connected to a control circuit which produces output control signals to apply power to the intermediate shaft to either speed it up or slow it down. In order to shift from one gear to another, the gear ratio into which the transmission will be shifted is selected and a signal indicating this selection is also applied to the control circuitry. The signals from the control device then control a power source, causing it to speed up or slow down the intermediate shaft until the ratio of the rotational speed of this shaft to the rotational speed of the output shaft is equal to that of the selected gear ratio. Since the gear train portion of the transmission is conventional, the invention may be embodied in a modification system for a conventional transmission.

To operate this transmission in a semi-automatic fashion, the operator disengages the friction clutch and shifts the transmission into neutral. He then selects the gear ratio into which the transmission will be shifted, thereby providing a signal to the control circuit. The control circuit provides a signal to an auxiliary power source, causing it to speed up or slow down the transmission intermediate shaft until the ratio of the output shaft speed to the intermediate shaft speed is the same as that for the desired gear ratio. The power source is auxiliary only to the transmission but may be derived from the engine or output shaft. It might also be derived from a stored energy source such as a flywheel in the transmission. When this matching has been accomplished, a signal to the operator will allow him to complete the shift and he then re-engages the friction clutch.

The operation of the transmission may be made completely automatic by providing automatically actuated clutch disengagement at preselected output shaft speeds and by utilizing a signal from the control circuit indicating matching speeds to actuate the shifting of the dog clutches into meshing relationship.

DESCRIPTION OF THE PREFERRED EMBODIMENT

Figure 1:
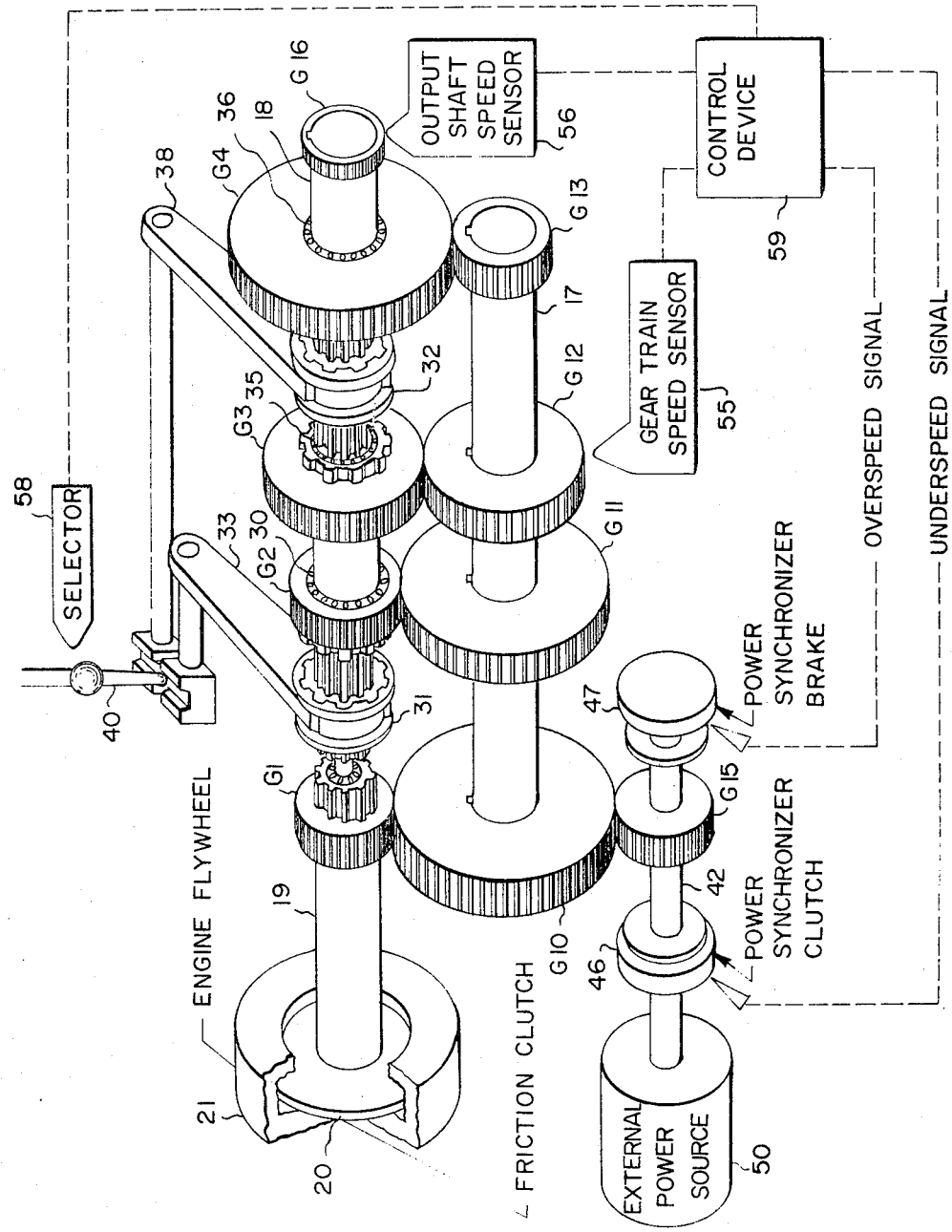
FIG. 1 is an illustration partially in perspective and partially in block diagrammatic form of a transmission constructed in accordance with the principles of this invention.

In FIG. 1 there is illustrated a transmission embodying the principles of this invention. The prime mover flywheel 21 is coupled through a friction clutch plate 20 to a driving gear G1. The clutch 20 may be engaged or disengaged thereby coupling or decoupling the gear G1 to the engine. In axial alignment with the shaft 19 carrying the gear G1 is in an output shaft 18.

The output shaft 18 has three gears (G2, G3, and G4) mounted on it by means of bearings 30, 35, and 36. Two dog clutch elements 31 and 32 are splined to the output shaft 18 such that they rotate with shaft 18 but may be moved axially in either direction along it in response to the motion of shifter forks 33 and 38.

Located on the face of gears G1 and G2 are hubs with external spline teeth which can be selectively engaged with internal spline teeth on dog clutch element 31 by translation of shifter fork 33. When the dog clutch element 31 is selectively engaged with either gear G1 or G2 the selected gear is thereby coupled to the output shaft 18 and forced to rotate with it. Gears G3 and G4 are similarly constructed and can be selectively coupled to the output shaft 18 by means of dog clutch element 32.

An intermediate shaft 17 runs parallel to the output shaft 18 and has fixed to it four gears G10, G11, G12, and G13 which are in constant mesh with gears G1, G2, G3, and G4 respectively.

The shifter forks 33 and 38 are controlled by a shift control lever 40. A third shaft 42 is mounted parallel to intermediate shaft 17 and carries on it gear G15 which is fixed to rotate with shaft 42 and is in constant mesh with gear G10. Shaft 42 carries on it two friction clutches 46 and 47, clutch 46 being positioned to engage an auxiliary power source 50, thus producing positive drive to the shaft 42 and the gear G15; clutch 47 being positioned to act as a brake on the rotation of shaft 42 and gear G15.

In addition to the mechanical elements of this transmission, there are included a number of electrical elements. Thus, a transducer 55 is positioned near gear G12 to sense the rotational speed of this gear and provide an output signal indicative of the rotational speed of shaft 17 to control device 59. The transducer 55 may, for example, be a magnetic induction pick-up head which responds to passage of the gear teeth by producing an electrical signal. A second transducer 56 is positioned near gear G16, which is permanently attached to the output shaft 18 and provides an output signal indicative of this rotational speed to control device 59. A selector unit 58 is associated with the shift control lever 40 such that it provides an output indicative of the selected gear ratio before dog clutch elements 31 and 32 engage the selected gear. The output of selector 58 provides a signal to the control device 59 indicating this selection. The control device 59 would typically be a circuit which compares the signal from the transducer 55 and the transducer 56 and provides an overspeed output signal when the ratio of the rotational speed of the intermediate shaft 17 to the output shaft 18 is larger than the ratio of the gears to be engaged in the selected position and similarly provides an underspeed signal when this ratio is smaller than the ratio of the gears selected to be engaged. The overspeed signal is applied to the clutch element 47 actuating that clutch to slow down the rotation of gear G15 while the underspeed signal is applied to clutch 46 actuating that clutch to apply power from the external source to speed up the rotation of gear 15.

The transmission as shown in FIG. 1 is in the neutral position; that is, there is no positive drive between the shaft 19 of the friction clutch 20 and the output shaft 18. To provide such a drive, the friction clutch 20 is disengaged and the desired gear ratio is selected in selector 58. If the vehicle is in motion, then the output shaft 18 is rotating at some speed and the transducer 56 is providing a signal to the control device 59 indicative of this speed. Transducer 55 produces a signal to control device 59 indicating the speed of intermediate shaft 17. The control device 59 will now provide an output signal if the ratio of the indicated speeds of the shafts 17 and 18 differ from that of the selected gear ratio. Depending upon whether the intermediate shaft needs to be slowed down or speeded up, the gear G15 will be slowed down or speeded up; and since it meshes continuously with gear G10 fixed to the intermediate shaft 17, it will change the speed of shaft 17 in a direction to achieve a matching speed to the output shaft 18. When the ratio of rotational speed between these two shafts is appropriate, then an overspeed or underspeed signal is no longer being produced by the control device 59 and the control device 59 may provide an indicating signal such as a light so that the driver may realize that the speeds of rotation of the elements to be engaged are matched. This indicating signal will not generally be necessary since the time required to achieve synchronization will be very short (i.e. in the order of 1 second or less). Thus, a brief delay in the shifting process should suffice to ensure that the matching speed condition has been achieved. The driver then moves the shift control lever 40 to engage one of the dog clutches 31 and 32 to provide a positive coupling between the input shaft 19 and the output shaft 18. He next engages the frictional clutch so that the engine is coupled through the selected gears to the output shaft 18.

Figure 2:
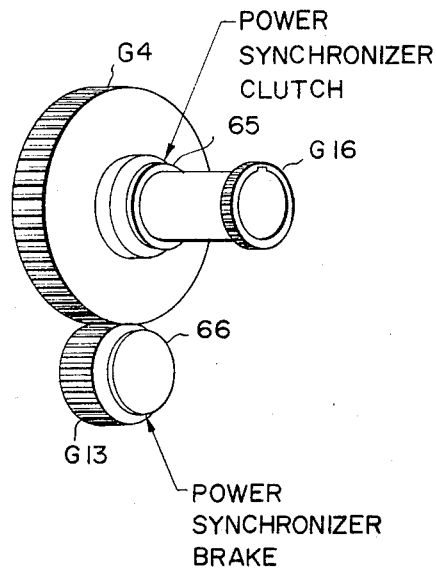
FIG. 2 is an illustration in perspective view of a portion of a transmission constructed in accordance with the principles of this invention.

The external power source 50 for providing a positive drive to the control gear G15 may take any of several forms. It may, for example, take the form of a small electrical motor of sufficiently high r.p.m. to drive the gear G15 to the maximum speed which would be required. In FIG. 2 there is illustrated an arrangement for deriving the positive drive for the power source 50 from the output shaft 18. A friction clutch 65 is mounted such that one element rotates with the output shaft 18 and the other element rotates with gear G4. Actuating this clutch will cause G4 to attempt to turn with the output shaft. Since G4 is continuously meshed with gear G13, this will cause intermediate shaft 17 also to be driven. Because the G13–G4 ratio provides the largest speed ratio, shaft 17 will always be capable of being driven at least as fast as is required to achieve the matched speed condition for any gear ratio. Also, as is shown, the brake element 66 may be mounted directly on shaft 17. In this configuration the clutch and brake elements 65 and 66 in FIG. 2 replace the corresponding elements 46 and 47 in FIG. 1, eliminating also the requirement for gear G15 and shaft 42 in FIG. 1.

While the transmission illustrated in FIG. 1 employs a series of four gears on the intermediate shaft and a series of three gears on the output shaft, the transmission of the invention is not, of course, so limited. Either one of the series could, in the extreme case, consist of only one gear which could be arranged to be selectively engaged to one of the multiple series on the other shaft.

Other gear systems such as a planetary transmission may also be employed in the transmission of this invention. For this instance the comparator element may, for example, be required to sense the relative speed of gear elements, either with respect to each other or to the case.

Figure 3:
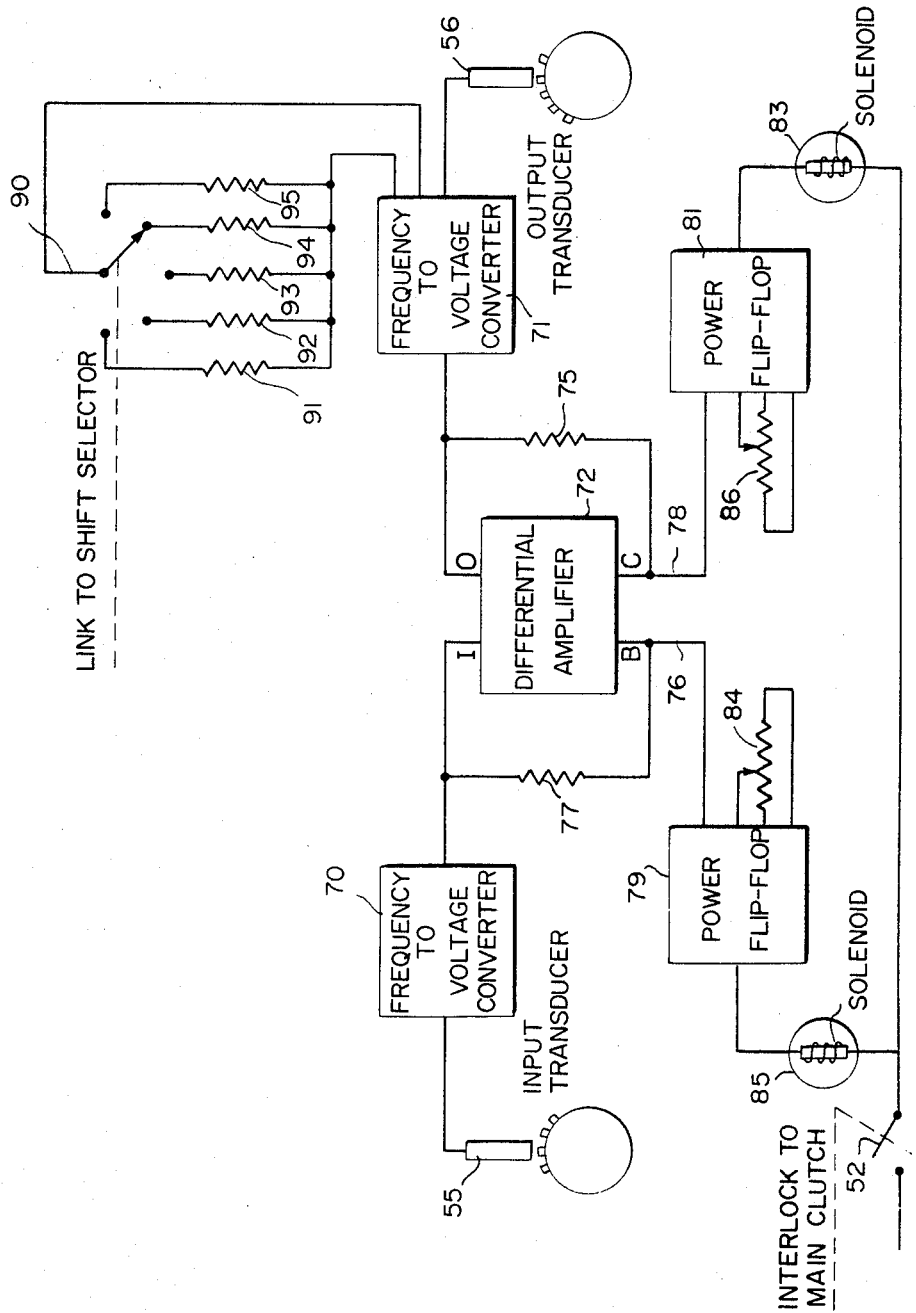
FIG. 3 is an illustration in block diagrammatic form of a circuitry useful in a transmission constructed in accordance with the principles of this invention.

In FIG. 3 there is illustrated in schematic form a convenient circuit arrangement to produce control signals for the transmission illustrated in FIG. 1. As previously described, a pair of transducers 55 and 56 are positioned to provide output signals indicative of the rotational speed of the intermediate transmission shaft and the output shaft respectively. Each one of these transducers produces an output signal pulse for each passage of a gear tooth by it. While the width of these pulses will vary with the speed of rotation of the shaft, the repetition rate will correspond exactly to this shaft speed. The signal from the input transducer 55 sensing the intermediate transmission shaft speed is coupled to a frequency to voltage converter 70 which generates a constant amplitude constant width pulse for each input pulse and then rectifies and filters these pulses, thereby producing a direct current output voltage of amplitude proportional to the repetition frequency of the input pulses and, therefore, proportional to the intermediate shaft angular velocity. The output transducer 56 which senses the rotational speed of the output shaft 18 is similarly connected to a frequency to voltage converter 71 which performs the same function as the frequency to voltage converter 70. The frequency to voltage conversion factor of the converter 70 remains constant; however, in the case of the frequency to voltage converter 71, the conversion factor is adjusted by the positioning of switch 90, which selects one of the resistors 91 through 95 according to the selected gear ratio. The output signals from each of the frequency to voltage converters 70 and 71 are applied as input signals to differential amplifier 72.

The differential amplifier has two inputs designated I and O respectively and two outputs designed B and C. The B output is connected to the input of power flip-flop unit 79, which is, in turn, connected to the coil of solenoid 85 which applies the braking power to the shaft 42 and hence slows down the intermediate gear train. Output C from the differential amplifier 72 is coupled to power flip-flop 81 which is in turn connected to the coil of solenoid 83 which actuates the clutch 46 to connect shaft 42 to an external power source. Each of the flip-flops 79 and 81 have bias potentiometers 84 and 86 respectively. Each of the power flip-flop stages are arranged such that when the input signal to it is less than a value determined by the setting of its bias potentiometer, the output to the respective solenoid will be zero. On the other hand, if the input signal to either power flip-flop 79 or 81 exceeds the selected bias value, the output signal immediately becomes maximum and actuates the connected solenoid coil. An interlock switch S2 is shown in the return lead of the solenoid coils. This interlock switch is operated by the control linkage of friction clutch 20 between the engine and the transmission such that when the clutch is engaged and the engine is directly coupled to the transmission, the switch S2 is opened, thereby preventing either solenoid 83 from being actuated.

Figure 5:
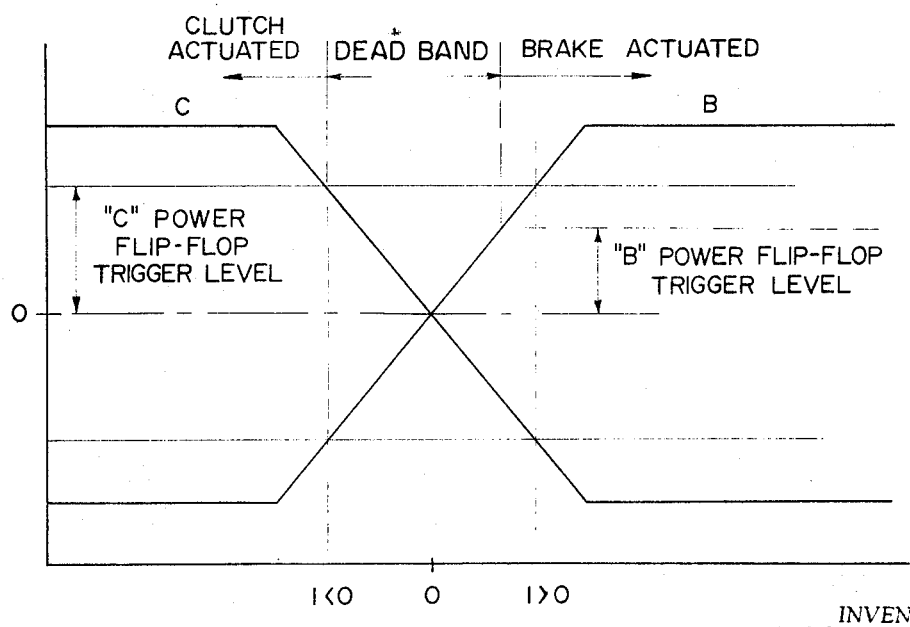
FIG. 5 is a graphic illustration of wave forms on the output of power flip-flop units illustrated in FIGS. 3 and 4.

The output characteristics of the differential amplifier 72 are illustrated in FIG. 5. It should be noted that these outputs, while dependent upon the relative values of the inputs I and O, are essentially independent of the absolute value of these inputs. Thus, when the input I is substantially less than the input O, output C of amplifier 72 is at its maximum positive value while output B is at its maximum negative value. As the differential voltage is decreased below a minimum value, however, the C output begins to decrease linearly until at a zero differential voltage both the B and C output voltages are also zero. A small differential voltage with the input I greater than input O results in a continuing increase in the B output voltage and a continuing decrease in the C output voltage until a critical value is reached where the voltage on input I is substantially greater than the voltage on input O and the B output voltage reaches a positive maximum and the C output voltage reaches a negative maximum. The slope of the output voltage wave form in the linearly changing region is a function of the value of the feedback resistors 75 and 77 of the differential amplifier 72.

In FIG. 5 there is shown also the trigger level values for the power flip-flop 79 and the power flip-flop 81. While in the illustration the power flip-flop 81 is shown as requiring a higher trigger level than power flip-flop 79, these may be adjusted to any suitable values and, in some instances, would be set at the same value. As also indicated in FIG. 5, the over-all circuit may be in any one of three conditions. One condition exists when the C output voltage exceeds in the positive direction the trigger level for power flip-flop 81 and thus the clutch solenoid 83 is actuated. A second condition exists when the voltage on the B output exceeds the trigger level of power flip-flop 79 and thus the brake solenoid is actuated. The third condition exists when neither the voltage on output C nor the voltage on output B has a sufficient positive value to exceed the respective trigger levels of power flip-flops 81 and 79. This condition is the dead band condition where neither the clutch or brake solenoid will be actuated.

It is apparent that the width of this dead band region will depend upon the setting of the bias potentiometers 84 and 86, as well as on the values of the feedback resistors 75 and 77. The dead band region can be decreased sufficiently so that the error in speed which it represents is substantially less than that which would be required for shifting. Typically, a dead band region corresponding to speed errors of plus or minus 5% maximum speed would produce this result. Normally, with a 5% maximum error the relative speed error between any two elements to be coupled would be well within the mechanical tolerances for transmissions.

The time limitation on the operation of the transmission described herein is principally limited by the response time of the solenoid operated clutch and brake combinations. The circuit speeds involved can be made faster than the response times for the available commerical clutch brake combinations.

In a specific numerical example, a heavy duty transmission might have available gear ratios of: 1.00, 1.85, 3.40, and 6.25. At a prime mover speed of 2000 r.p.m. the input frequency to voltage converter 70 may be designed to produce a 4 volt output. The output converter 71 may then be arranged to produce a 4 volt output at a shaft speed corresponding to the 2000 r.p.m. input shaft speed divided by the selected gear ratio. Thus, at gear ratio 6.25 this converter will produce 4 volts for an output shaft speed of 320 r.p.m. When the selected gear ratio is 3.40, however, an output shaft speed of 588 r.p.m. produces a 4 volt output from the converter 71.

Figure 4:
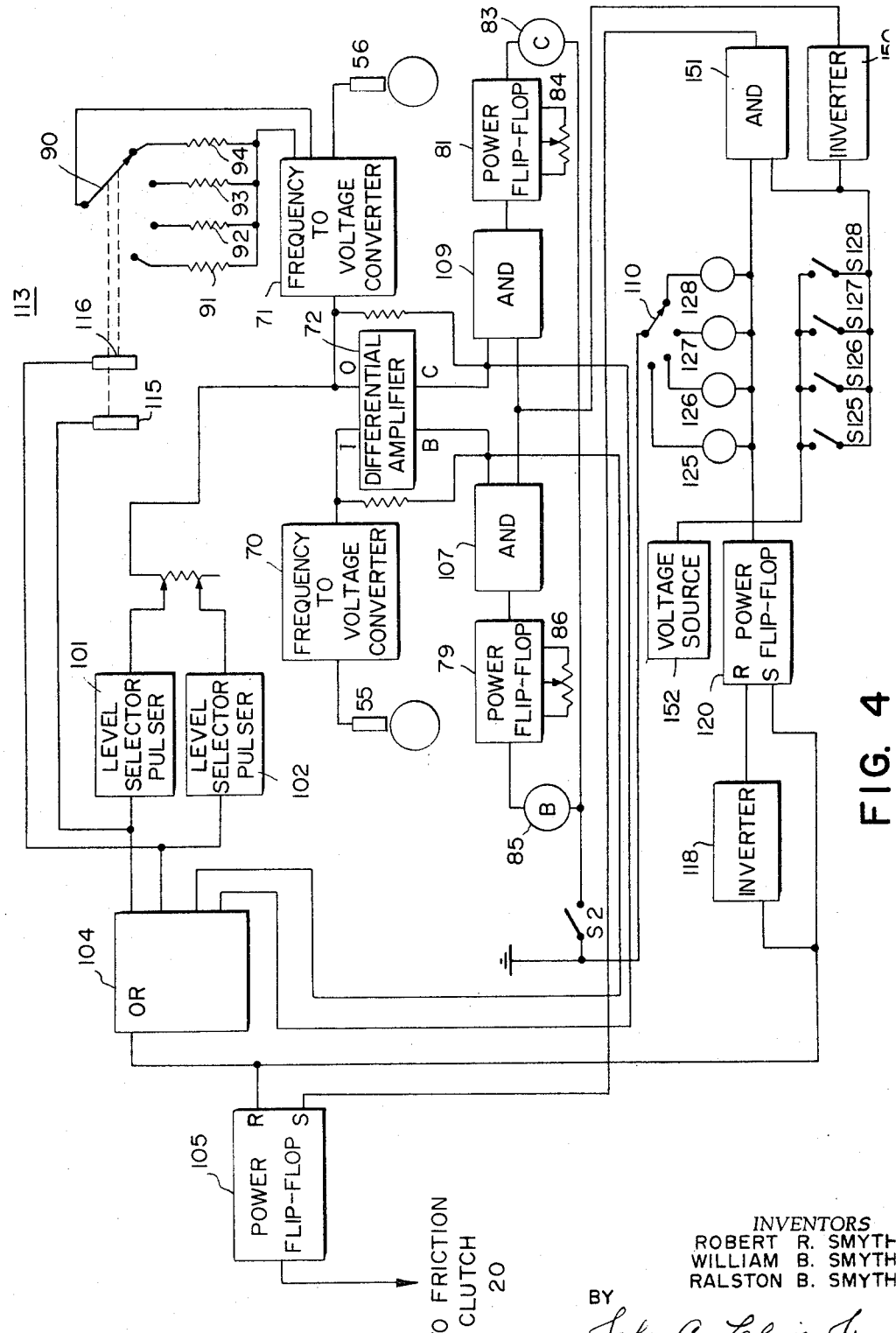
FIG. 4 is an illustration in block diagrammatic form of circuitry suitable for use in an automatic transmission constructed in accordance with the principles of this invention.

The previous discussion of the transmission illustrated in FIG. 1, together with the circuit of FIG. 3, has been concerned with operation in the semi-automatic mode. By the addition of suitable components, the transmission may be operated entirely automatically. A system for automatically operating a transmission in accordance with the principles of this invention is illustrated in block diagrammatic form in FIG. 4. In FIG. 4 like numbers refer to like parts of the system illustrated in FIGS. 1 and 3.

In the circuit illustrated in FIG. 4 there are connected to the output of the frequency to voltage converter 71 a pair of level selector pulsers 101 and 102. Level selector 101 is a voltage discriminator which is adjusted to provide output pulses only when the output from the frequency to voltage converter 71 exceeds a specific value, while level selector 102 is a similar voltage discriminator which has been adjusted to provide an output pulse only when the output voltage from the frequency to voltage converter 71 falls below a specific value. These levels are selected to correspond to the maximum and minimum efficient operating speeds of the engine. These levels are not necessarily fixed but may be modified by accelerator position, operator control, or other factors. The output pulses from level selector 101 are connected as one input to OR gate 104 and also to coil 115 of stepping relay 113. The output pulses from level selector 102 are connected as the second input to OR gate 104 and also to coil 116 of stepping relay 113.

The output of OR gate 104 is connected to the reset input of power flip-flop 105, the set input of power flip-flop 120, and also as one input to inverter 118. The output of flip-flop 105 is connected to a controlling device for friction clutch 20. The stepping relay 113 operates two switches 90 and 110. The coil 115 steps these switches in one direction such that the switch arms are moved to a lower numerical position, while the coil 116 steps the switch arms in the opposite direction.

The second section 110 of the stepping switch 113 connects the output of a power flip-flop 120 to selected ones of a series of shifter fork positioning devices 125 through 128. These positioning devices, when electrically actuated, will cause a dog clutch in the transmission to engage in a meshing relationship with a selected gear. These positioning devices are arranged to disengage the dog clutch when the main clutch 20 is disengaged and the positioning device is deactivated. When the reset input of the power flip-flop 120 is actuated, this flip-flop provides an actuating signal through the switch 110 to the selected positioning device. The reset input is actuated by a signal from inverter 118 which occurs only when it has no input. This condition can only occur when there is no output from the OR gate 104. Thus, no signal at the input of inverter 118 indicates that the selected elements in the transmission to be meshed are moving at substantially the same speed.

In the circuit of FIG. 4, output B from differential amplifier 72 is connected as one input to AND gate 107, the output of which is the actuating input to power flip-flop 79. Similarly, output C from amplifier 72 is connected as one input to AND gate 109, the output of which actuates power flip-flop 81. The second input of both AND gates 107 and 109 is provided from inverter 150. The input to inverter 150 is provided from voltage source 152 through switches S125 through S128. Each switch corresponds to the similarly numbered positioning device and is arranged such that if the dog clutch element controlled by that positioning device is engaged, the corresponding one of switches S125 through S128 is closed. When any switch is closed, the inverter 150 will have no output and hence AND gates 107 and 109 can have no output. This arrangement ensures that the brake 85 or the clutch 83 can be actuated only when the transmission is in the neutral position with no dog clutch engaged.

AND gate 151 has one input directly connected to the output of power flip-flop 120 and a second input connected to the input of inverter 150. An output from AND gate 151 will occur only when one of the positioning devices 125 through 128 is energized and the corresponding dog clutch element is engaged. The output from AND gate 151 is connected to the set input of power flip-flop 105.

The power flip-flop 105 provides an output signal only when its reset input is actuated. This signal is utilized to operate an electric air valve or similar element which in turn operates to disengage the main friction clutch 20, disengaging the prime mover from the transmission.

The OR gate 104 will provide a signal to the reset input of power flip-flop 105 whenever there is an output from either level selector 101 or 102 or whenever there is a speed error indication at the B or C output of differential amplifier 72.

The operation of the above described system is as follows: If the output of frequency to voltage converter 71 indicates that the prime mover speed is either above or below the desired operating range, an output pulse will be produced by the corresponding level selector 101 or 102. An output pulse from either level selector will: actuate power flip-flop 105 through OR gate 104, causing the main clutch 20 to disengage; also through OR gate 104 actuate the set input of power flip-flop 120, removing power from all shifter fork positioning devices 125 through 128; and, depending upon the level selector producing the pulse, will provide a signal to coil 115 or 116 of stepping relay 113. As a result of that signal on one of its coils, stepping relay 113 will move to a new position corresponding to the next higher or lower gear ratio. This will cause switch section 90 to move, selecting a new conversion factor for frequency to voltage converter 71 and corresponding positioning device to be connected through switch arm 110. If, in this new position, the output from frequency to voltage converter 71 is within the acceptable limits, no further pulse will be delivered from either level selector 101 or 102. If in this new position the output from level selector 71 is still not within the allowable limits, additional pulses will be delivered by level selector 101 or 102, causing relay 113 to take additional steps. This process will be automatically continued until the proper gear for the existing output shaft speed has been selected.

The change in conversion factor for frequency to voltage converter 71 will have in general caused an error signal at the input to differential amplifier 72 and a corresponding signal to appear at its B or C output.

Since power flip-flop 120 is then in the set condition, the dog clutch elements will go to their neutral or disengaged position. When all dog clutches are disengaged, inverter 150 will provide an output signal to AND gates 107 and 109. Then the output B or C of differential amplifier 72 can provide an input to power flip-flop 79 or 81, operating brake 85, or clutch 83 as required.

The operation of the system proceeds in the same manner as in the semi-automatic case until the intermediate shaft has been brought to the matched speed condition.

When the matched speed condition is achieved, there will be no input to OR gate 104 and thus to inverter 118. When there is no input to inverter 118 it will provide an output to the reset input of power flip-flop 120, causing it to actuate the selected one of shifter fork positioning devices 125 through 128. Afer this occurs and when the corresponding switch S125 through S128 indicates that the corresponding dog clutch element is engaged, the output from AND gate 151 will set power flip-flop 105, removing its output and allowing main clutch 20 to reengage.

At this point the shift has been completed and the vehicle is now operating in a new gear ratio. It should be noted that this arrangement permits the gear ratio to be increased or decreased depending upon the speed of the vehicle and the proper gear ratio for the existing speed to be automatically selected. It should also be apparent that various additions to modify certain of these operations or skip from one gear to another, etc., depending upon such things as accelerator position or other control factors may also be arranged.

While the system for this transmission has been described in general in terms of a frequency to voltage converter, other variations of the control system may be employed. For example, the pulses from the transducer on the output shaft could be divided down until a frequency was generated which would correspond to the desired intermediate shaft speed. This divided frequency could then be used to operate a DC or AC inverter or an AC to AC cyclo-converter. The output of this inverter could then be used to drive the intermediate transmission shaft by means of a synchronous motor. This would automatically drive the intermediate shaft to exactly the proper speed.

Having described the invention, various modifications and improvements may now occur to those skilled in the art and the invention described herein should be construed as limited only by the spirit and scope of the appended claims.

What is claimed is:

1. A transmission for coupling a prime mover to an output shaft at selected ones of a plurality of gear ratios comprising:
   an intermediate shaft;
   means for connecting and disconnecting said prime mover and said intermediate shaft;
   engageable coupling means for coupling said intermediate shaft and said output shaft, said coupling means including a first series of gears, the speed of rotation of said first series of gears being determined by the speed of rotation of said intermediate shaft, and a second series of gears which mesh with said first series of gears;
   means for engaging said coupling means to operatively couple said intermediate shaft to said output shaft through a selected one of said first series of gears in meshed relationship with a selected one of said second series of gears, said engaging means being properly engageable only when the relative speed between the elements of said coupling means is within a predetermined range of values;
   comparator means for sensing said relative speed and providing an output control signal related to said relative speed;
   a power source including:
   drive means and braking means; and
   control means responsive to a comparator control signal of one type to actuate said drive means to couple said power source to said intermediate shaft to increase said intermediate shaft speed until the relative speed between the elements of said coupling means is within the predetermined range of values and said control means being responsive to a control signal of different type to actuate said braking means to decrease said intermediate shaft speed until the relative speed between the elements of said coupling means is within said predetermined range, said control means only being operative when means for connecting said prime mover and said intermediate shaft is in its disconnected position.

2. A transmission in accordance with claim 1 wherein said comparator means includes first sensing means for producing a signal responsive to the rotational speed of said intermediate shaft, and second sensing means for producing a signal responsive to the rotational speed of said output shaft.

3. A transmission in accordance with claim 2 wherein said first sensing element produces an electrical signal at a frequency related to the rotational speed of said intermediate shaft and said second sensing element produces an electrical signal at a frequency related to the rotational speed of said output shaft and further including a first frequency to voltage converter coupled to said first sensing element to produce a voltage signal proportional to the frequency from said first sensing element and a second frequency to voltage converter coupled to said second sensing element to produce a voltage proportional to the frequency from said second element.

4. A transmission in accordance with claim 3 wherein said second frequency to voltage converter has a selectable conversion factor and includes means responsive to the selection of said gear ratio for adjusting the conversion factor in accordance with said selected gear ratio and wherein said comparator means comprises a differential amplifier having first and second inputs and first and second outputs, said first input being connected to said first frequency to voltage converter and said second input being connected to said second frequency to voltage converter, said differential amplifier first output lead being actuated when the voltage difference between said first and said second amplifier inputs is of one polarity and said second differential amplifier output lead being actuated when said voltage difference between said first and second inputs is of opposite polarity.

5. A transmission in accordance with claim 4 wherein said control means for coupling said power source comprises first and second electrically operated clutches, said first clutch actuating said braking means and said second clutch actuating said drive means, said first differential amplifier output lead actuating said first clutch and said second differential amplifier output lead actuating said second clutch.

6. A transmission in accordance with claim 5 wherein said drive means is a power take-off from said output shaft.

7. A transmission in accordance with claim 6 and including as said drive clutch; a friction clutch on said output shaft positioned to engage an element fixed to rotate with said intermediate shaft, whereby actuation of said friction clutch couples the rotational motion of said output shaft to said intermediate shaft.

8. A transmission in accordance with claim 5 wherein said drive means is an electrical motor.

9. A transmission in accordance with claim 3 and further including,
   discriminator means connected to the output of said second frequency to voltage converter, said discriminator means actuating a first output when the voltage from said second frequency to voltage converter exceeds a predetermined value, said discriminator actuating a second output when the voltage from said frequency to voltage converter decreases below a second predetermined value;
   means responsive to the actuation of any output from said discriminator means for disconnecting said power drive from said intermediate shaft,
   shift selector means responsive to the actuation of said first discriminator output for selecting a lower gear ratio and responsive to the actuation of said second discriminator output for selecting a higher gear ratio, and
   shift means for operating said engaging means to operatively couple said intermediate shaft and said output shaft after the relative speed of said coupling means elements is within a predetermined range of values.

10. A transmission in accordance with claim 1 wherein said control means for coupling said power source comprises first and second clutches coupled to said drive means and said braking means respectively, said first clutch being actuated by a comparator signal indicating a relative speed in one direction and said second clutch being actuated by a comparator signal indicating relative speed in the opposite direction, said control means continuing to respond to said control signal to maintain said relative speed within said predetermined range of values until said coupling means is engaged.

11. A transmission in accordance with claim 1 wherein said drive means is a power takeoff from said output shaft.

12. A transmission in accordance with claim 11 and including a friction clutch on said output shaft positioned to engage an element fixed to rotate with said intermediate shaft, whereby actuation of said friction clutch couples the rotational motion of said output shaft to said intermediate shaft.

13. A transmission in accordance with claim 1 wherein said comparator means provides at least one output signal related to the rotational speed of said output shaft and further including a discriminator means coupled to this output from said comparator, said discriminator means providing an output signal whenever said rotational speed exceeds a predetermined range, said predetermined range being variable depending upon the ratio of the gears which are meshed; and means responsive to the output of said discriminator means for disconnecting said power drive from said intermediate shaft, and shift selector means responsive to a signal from said discriminator indicating a rotational speed above the upper limit of said range for selecting a lower gear ratio and responsive to a signal below the lower limit of said rotational speed range for selecting a higher gear ratio, and shift means for operating said engaging means to operatively couple said intermediate shaft and said output shaft after the relative speed of said coupling means elements is within a predetermined range of values.

14. In a transmission for coupling a prime mover to an output shaft, wherein said transmission includes a main shaft and an intermediate shaft and clutch means for disengaging said prime mover from said transmission in order to allow a change of the coupling gear ratio by selecting a different pair of gears carried by said main shaft and said intermediate shaft respectively, the improvement comprising, means for sensing the relative speed between said main shaft and said intermediate shaft and providing an output signal related to the difference between these speeds;

a power source including a driving means and a braking means; and control means responsive to the output from said sensing means for providing a control signal when the ratio between the speeds of said main shaft and said intermediate shaft differs substantially from the selected gear ratio, said control signal being applied to said power source, when said clutch has disengaged said prime mover, to couple one of said drive means and said braking means to said intermediate shaft to control the speed of said intermediate shaft to bring the ratio of speed between said intermediate shaft and main shaft into substantial equality with said selected gear ratio and maintain said equality until said prime mover is recoupled to said output shaft through said selected gears.

References Cited

UNITED STATES PATENTS

| | | | |
|---|---|---|---|
| 3,103,826 | 9/1963 | Jaeschke | 74—365 |
| 3,182,778 | 5/1965 | Droschel | 74—339 |
| 3,248,962 | 5/1966 | McNamara et al. | 74—339 |
| 3,364,795 | 1/1968 | De Castelet | 74—339 |

ARTHUR T. McKEON, Primary Examiner

U.S. Cl. X.R.

74—339, 365, 866